Dec. 2, 1969  R. L. GOWER  3,481,383
TRACTION DEVICE FOR VEHICLES
Filed Nov. 13, 1967  2 Sheets-Sheet 2

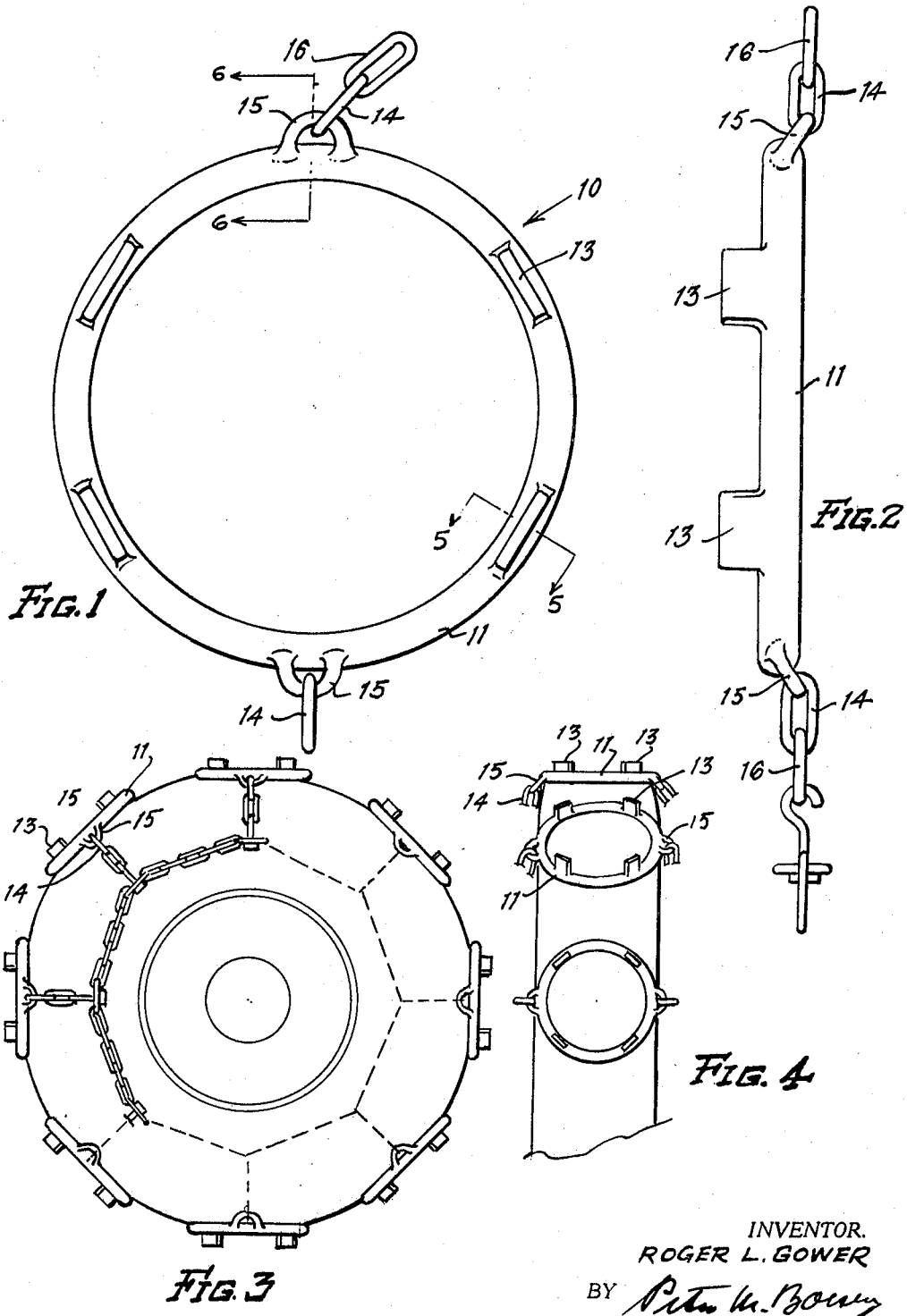

INVENTOR.
ROGER L. GOWER
BY ns
3,481,383
TRACTION DEVICE FOR VEHICLES
Roger L. Gower, P.O. Box 65, Canaan, Maine 04924
Filed Nov. 13, 1967, Ser. No. 682,187
Int. Cl. B60c *27/06*
U.S. Cl. 152—229             1 Claim

ABSTRACT OF THE DISCLOSURE

This invention relates to an improvement in traction devices for vehicles, by the provision of assemblies of rings having cleat-type projections thereon and formed integrally therewith, and each of said rings being connected to a pair of conventional side chains independently of the others of said rings comprising the assembly.

---

This invention constitutes an improvement of my invention patented April 11, 1967 under No. 3,313,335. This said invention relates to further new and useful improvements in traction devices for vehicles, and more especially to tractor tire chains, and it has among its objects to provide a device that will fit more closely upon a tire than any of those now commonly used.

Based upon prolonged tests, it appears that the device forming the subject of this invention is not only most practical in operation, but is also greatly resistant to wear and tear.

Some of the further distinct advantages are that tires cannot slip inside the assemblies of this invention, and that said traction devices cannot slip into tire grooves; the said devices will work well in snow, mud and ice, and will not plug up or freeze up; further, this device eliminates chances of broken axles and differentials, because it keeps slipping wheels from catching and snapping.

Another advantage resides in the fact that in the operation, according to my invention, only two attaching chains are used for attaching a traction member to the side-wall chain, thereby providing a more compact fitting of same, and avoiding wobbling and excessive movement of said parts, thus eliminating excessive wear among the latter.

A ring member consists of a casting or forging in annular form having thereon, at spaced apart intervals, projections in transverse relationship to the plane of said annular ring. Oppositely disposed upon the periphery of said ring and projecting outwardly therefrom are loops integral with said ring, so formed and of a size suitable to accommodate links as of chain for the attachment of said member to the side chains of a tire chain assembly. Said loops are disposed at an angle of approximately 30 degrees from the plane of said ring, in a direction opposite to that in which said projections extend, thus permitting the links of chain, interconnected to the said loops, to align substantially with the said side chains.

With the above and other objects in view, this invention consists of the novel features, combination and arrangement of parts, hereinafter fully described, claimed and illustrated in the accompanying drawings, forming part of this application, in which similar characters of reference indicate corresponding parts in all views, and in which:

FIGURE 1 is a plan view of the ring section of a traction assembly;

FIGURE 2 is an elongational side view thereof;

FIGURE 3 is a side elevational view showing a traction assembly attached to a vehicle wheel; and FIGURE 4 is a top plan view, in part, of the illustration in FIGURE 3.

Figure 5:
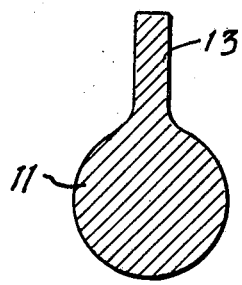
FIGURE 5 is a cross-section taken on line 5—5 of FIGURE 1.
Figure 6:
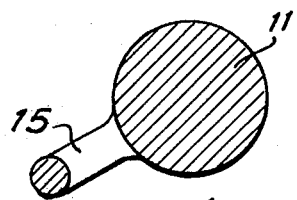
FIGURE 6 is a cross-section taken on line 6—6 of FIGURE 1.

Referring more particularly to the drawings, the numeral 10 indicates a unit of a traction assembly comprising a ring 11 and having integral therewith projections 13 spaced apart upon the periphery of the ring, and oppositely disposed loops 15, likewise integral with said ring. Chain links 14, 14 are interconnected with said loops 15, 15, and continuing interconnected links 16 form a part of the connection between said ring member and the side chains.

Figure 7:
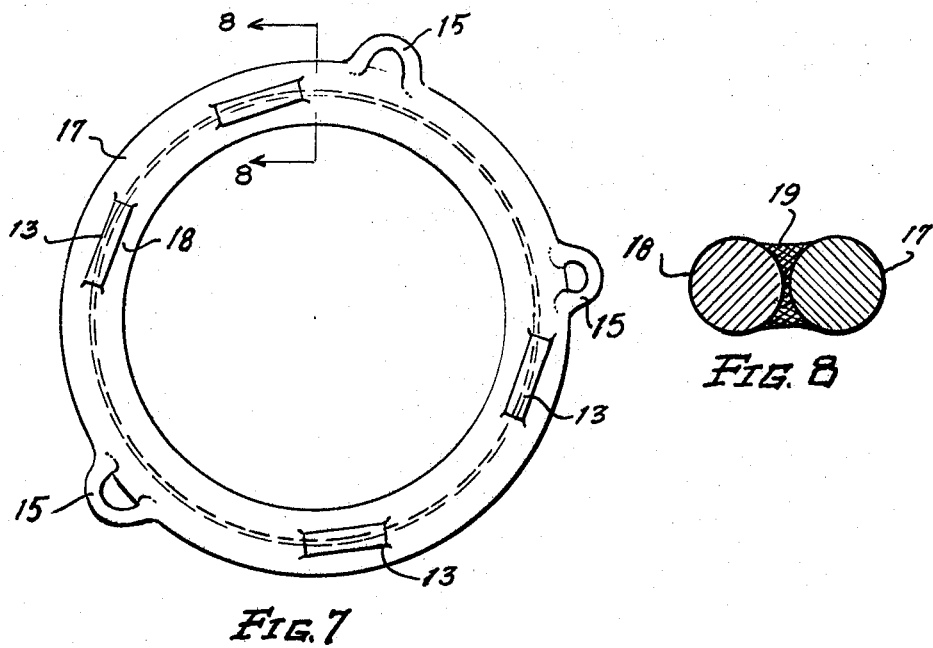
FIGURE 7 is a modification of the invention, wherein said ring member has been formed as though by the use of a pair of mating concentric rings constituting in cross-section an ellipsoid, formed into an annular, or substantially circular ring, having the same cleat-type projections and connecting loops as in the structure of FIGURE 1.
Figure 8:
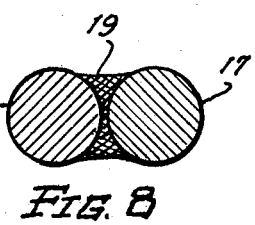
FIGURE 8 is a cross-section taken on line 8—8 of FIGURE 7.

In FIGURE 7, the structure appears as a pair of concentric rings 17 and 18, tangentially and integrally connected, with the configuration of the ellipsoid formed by said two concentric rings being further shown in FIGURE 8, wherein at 19 there is shown the transformation of the ellipsoid into an ellipse having parallel flat sides.

In order to provide for proper fitting of said rings upon certain patterns of tire treads, it has been found desirable to provide for two loops on one side of each ring and a single loop on the opposite side thereof, thus providing for nesting of said loops between the spaced segments of the tire tread, and elimination of slipping of the assembly upon the tire. Such multiple loops are shown in FIGURE 7.

It is obvious that changes may be made in the form and construction shown and described herein, and I do not, therefore, wish to confine myself to the exact disclosure set forth herein.

What I claim as my invention, and wish to secure by Letters Patent of the United States, is:

1. A traction assembly for vehicles, comprising a plurality of ring members flexibly connected to side chains, each of said members having the configuration of multiple concentric rings disposed in the same plane; projections at spaced intervals upon the periphery thereof, disposed in transverse relationship to the plane of said concentric rings, and upon opposite sides of said member, loops extending outwardly therefrom and disposed angularly from the plane of said rings in a direction opposite to the direction of said projections; each of said rings, with its projections and loops, being integrally formed as a single unit of said assembly.

References Cited

UNITED STATES PATENTS 2,489,110   11/1949   Small _____ 152—230
3,313,335   4/1967   Gower _____ 152—229

ARTHUR L. LA POINT, Primary Examiner

C. B. LYON, Assistant Examiner

U.S. Cl. X.R.

152—243